US008829425B1

(12) United States Patent
Yang et al.

(10) Patent No.: US 8,829,425 B1
(45) Date of Patent: Sep. 9, 2014

(54) APPARATUS AND METHODS FOR CREATING A VACUUM IN A PORTABLE MASS SPECTROMETER

(71) Applicants: William (Wei) Yang, Los Altos, CA (US); Charlie Zhang, Fremont, CA (US); Ming Chai, Union City, CA (US); Yongqiang Qiu, San Rafael, CA (US); Doneil Hoekman, Santa Clara, CA (US)

(72) Inventors: William (Wei) Yang, Los Altos, CA (US); Charlie Zhang, Fremont, CA (US); Ming Chai, Union City, CA (US); Yongqiang Qiu, San Rafael, CA (US); Doneil Hoekman, Santa Clara, CA (US)

(73) Assignee: BaySpec, Inc., San Jose, CA (US)

( * ) Notice: Subject to any disclaimer, the term of this patent is extended or adjusted under 35 U.S.C. 154(b) by 0 days.

(21) Appl. No.: 14/228,379

(22) Filed: Mar. 28, 2014

Related U.S. Application Data

(60) Provisional application No. 61/827,527, filed on May 24, 2013.

(51) Int. Cl.

| | |
|---|---|
| ***H01J 49/26*** | (2006.01) |
| ***H01J 49/10*** | (2006.01) |
| ***B01D 59/44*** | (2006.01) |
| ***H01J 49/00*** | (2006.01) |
| ***H01J 49/24*** | (2006.01) |

(52) U.S. Cl.
CPC ............. *H01J 49/24* (2013.01); *H01J 49/0022* (2013.01)
USPC ....... 250/281; 250/282; 250/288; 250/441.11

(58) Field of Classification Search
CPC . G01N 1/405; G01N 1/2273; B01D 53/0438; B01D 15/163; H01J 49/0418; B01L 2300/0838; B01L 3/565; B01L 3/5027; B01L 2200/027; B01L 2200/0621; B01L 2200/0652; B01L 2200/0668
USPC ............................ 250/281, 282, 288, 441.11
See application file for complete search history.

(56) References Cited

U.S. PATENT DOCUMENTS

| | | | | |
|---|---|---|---|---|
| 3,591,827 A | | 7/1971 | Hall | |
| 5,155,357 A | * | 10/1992 | Hemond | 250/291 |
| 5,313,061 A | * | 5/1994 | Drew et al. | 250/281 |
| 5,345,787 A | | 9/1994 | Piltingsrud | |
| 5,401,963 A | | 3/1995 | Sittler | |

(Continued)

OTHER PUBLICATIONS

Gao, Design and Characterization of a Multisource Hand-Held Tandem Mass Spectrometer, Analytical Chemistry, Oct. 1, 2008, pp. 7198-7205, vol. 80 No. 19, Publisher: American Chemical Society, USA.

(Continued)

*Primary Examiner* — Nikita Wells
(74) *Attorney, Agent, or Firm* — Doneil Hoekman

(57) ABSTRACT

A portable or handheld mass spectrometer making use of a cryogenic pumping, ion pumping or getter pumping system. The portable mass spectrometer contains a cryopump, ion pump, or getter pump, and operates in conjunction with a fixed docking station. The docking station contains a backing pump to bring the mass spectrometer manifold down to operating pressure prior to being placed into portable operation using the cryopump, ion pump, or getter pump. The individual pumps may be operated either separately or simultaneously. This configuration permits the portable mass spectrometer module to be small, lightweight and rugged, and yet be easily and quickly recharged and regenerated for use in either a field or laboratory environment.

14 Claims, 2 Drawing Sheets

(56) References Cited

U.S. PATENT DOCUMENTS

| | | | | |
|---|---|---|---|---|
| 5,426,300 | A | 6/1995 | Voss | |
| 5,525,799 | A | 6/1996 | Andresen | |
| 5,539,204 | A | 7/1996 | Coutts | |
| 7,772,546 | B2 * | 8/2010 | Jackson | 250/281 |
| 8,287,247 | B2 | 10/2012 | Bonucci | |
| 8,471,199 | B1 * | 6/2013 | Doroshenko et al. | 250/281 |
| 2012/0138790 | A1 | 6/2012 | Wright | |

OTHER PUBLICATIONS

Keil, Ambient Mass Spectrometry with a Handheld Mass Spectrometer at High Pressure, Analytical Chemistry, Oct. 15, 2007, pp. 7734-7739, vol. 79 No. 20, Publisher: American Chemical Society, USA.

Pau, Microfabricated Quadrupole Ion Trap for Mass Spectrometer Applications, Physical Review Letters, Mar. 31, 2006, pp. 120801-1 to 120801-4, PRL 96, Publisher: American Physical Society, USA.

* cited by examiner

APPARATUS AND METHODS FOR CREATING A VACUUM IN A PORTABLE MASS SPECTROMETER

CROSS-REFERENCE TO RELATED APPLICATIONS

This application claims the benefit of U.S. Provisional Patent Application No. 61/827,527, filed May 24, 2013, by William Yang, Charlie Zhang, Ming Chai, Yongqiang Qiu, and titled APPARATUS AND METHODS FOR PUMPING A PORTABLE MASS SPECTROMETER.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Mass spectrometry was originally dominated by massive instrumentation. Mass spectrometers would routinely fill an entire room and weigh hundreds, or even thousands of pounds. However, smaller and lighter instruments employing quadrupole technology eventually developed. Instrumentation built upon the "ion trap", in which the entire mass spec analyzer could easily be held in the palm of one hand eventually developed.

Along with this compression in size, there were attempts made at developing portable mass spectrometers, allowing an operator the ability to essentially take the mass spectrometry lab to the sample, as opposed to taking the sample to the lab.

These small instruments faced numerous challenges. To start with, everything had to be powered by a portable battery. Additionally, a vacuum system needed to be developed that could handle the sample load, in addition to generating a workable vacuum for the instrument.

Various attempts have been made at producing small, portable, and even handheld mass spectrometers, with perhaps the most fundamental challenge being the creation of an appropriate vacuum, and the ability to maintain an acceptable working vacuum during operation of the instrument.

One approach taken by at least two organizations makes use of an ion pump. With this geometry, the mass spectrometer must initially be "pumped down" to a pressure, typically below $10^{-3}$ Torr. Once this pressure has been reached, the ion pump may be turned on and the instrument placed into service in the field. The ion pump must then be run either periodically, or at least intermittently, in order to maintain a workable operating pressure for the mass spectrometer. This geometry has the advantage that the ion pump has no moving parts and is very rugged for use in a field environment. The major drawback to the ion pump is that its operating life is inversely related to the pressure at which it operates. As the mass spectrometer is used to analyze samples, the pressure within the instrument increases, placing a larger load on the ion pump, directly reducing its lifetime. Further, the ion pump cannot simply be regenerated. The mass spectrometer must be opened up and the adsorbing material, typically a titanium strip, must be replaced.

Another approach taken by some developers has been to use a small turbomolecular pump, backed up by a correspondingly small roughing pump. This approach basically takes all the pumping hardware of a conventional lab mass spectrometer and places it into a portable mass spectrometer. Although this approach provides an ideal pumping system for a mass spectrometer, it has several severe drawbacks. The most significant being that the turbomolecular pump itself is a very delicate device and can be easily damaged through any type of sudden shock or sudden venting of the system.

Another attempt at developing a portable mass spectrometer has been to use a small cryocooling device in conjunction with a cold finger, but this approach required the use of an additional vacuum pump to pump down the mass spectrometer vacuum manifold prior to operating the cryocooler module.

Therefore, while mass spectrometers have seen dramatic reductions in size, their use in a demanding field environment still represents a major challenge.

SUMMARY OF THE INVENTION

One embodiment of this invention involves the use of a small cryogenic cooling device placed inside the vacuum chamber of a portable mass spectrometer. The cooling device typically employs the use of a Stirling engine, which is capable of developing temperatures below 77 degrees Kelvin (the boiling point of Nitrogen). The low temperatures are generated within a metal cylindrical "cold finger" rod, having dimensions on the order of 1 cm in diameter with a length of 4 or 5 cm.

When the Stirling engine cryocooling device is actuated, the temperature of the attached cold finger causes the individual molecules within the vacuum manifold to condense onto the metallic surface of the cold finger, directly reducing the pressure within the vacuum manifold.

Although a portable mass spectrometer is limited in size, weight and power, and the cryogenic cooling pump described here has a limited pumping capacity, it is still capable of generating a vacuum within a small manifold on the order of $10^{-3}$ Torr, which is an acceptable pressure at which to operate a 3-dimensional ion trap, a cylindrical ion trap, a linear trap, or a recti-linear ion trap mass spectrometer analyzer.

Some portable mass spectrometer geometries employ a gas chromatograph column in which Helium is used as the carrier gas. In such a situation, due to the low molecular weight and very low boiling point (4.2 degrees Kelvin) of Helium, the cryogenic pump will not be able to pump away the helium carrier gas. In such a situation, when a gas chromatograph is employed, or Helium is injected into the instrument to be used as a buffer gas, a small ion pump (which could comprise a standard diode pump, a noble diode pump or a triode pump) may be employed in addition to the cryogenic pump.

It is also possible to configure the portable mass spectrometer to operate with a simple getter pump instead of a cryogenic pump, or to operate with both the cryogenic pump and the getter pump together.

Figure 1:
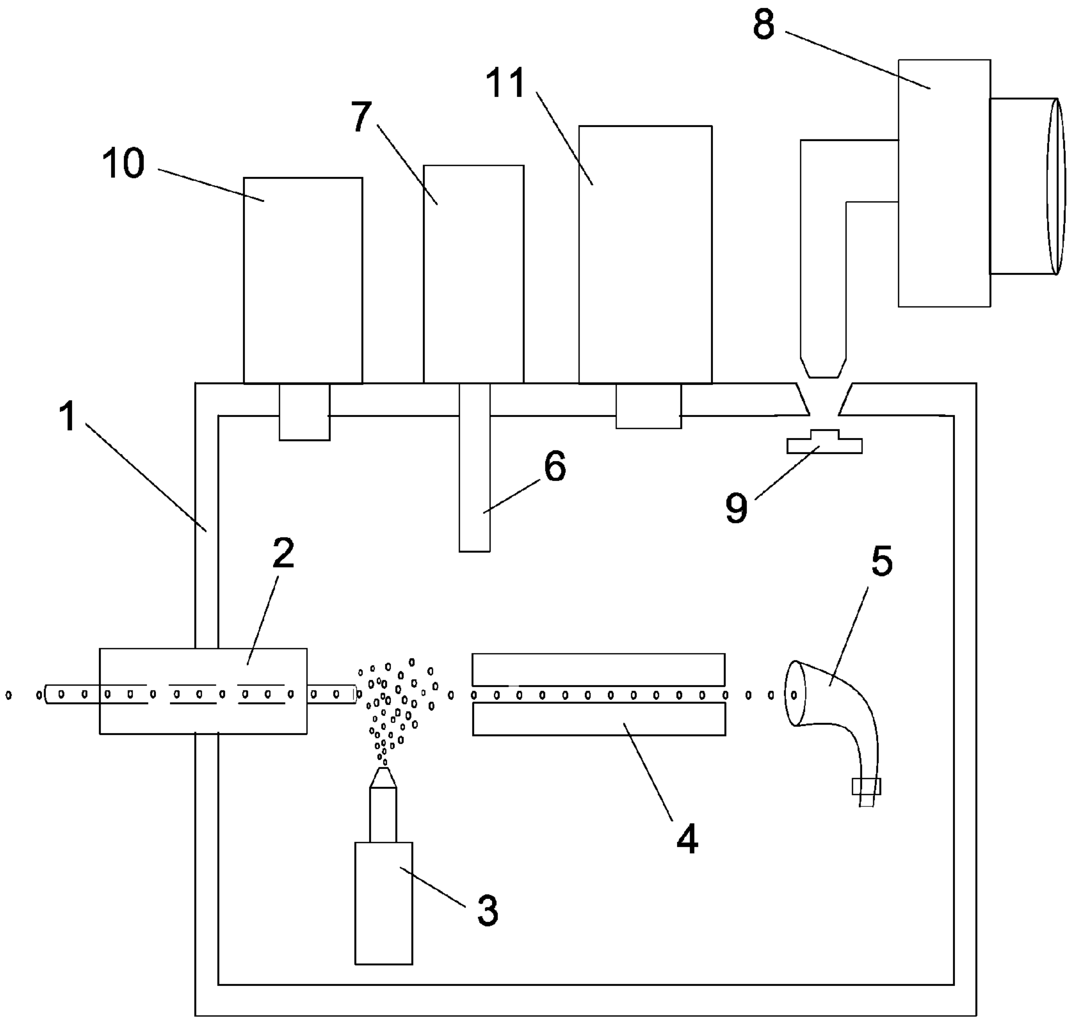
FIG. 1 shows a simple block diagram of a portable, or handheld, type of mass spectrometer. Element 1 is the manifold containing the actual mass spectrometer itself. A typical manifold used to house a mass spectrometer will be constructed from stainless steel and will be strong enough to maintain an operating vacuum (typically at least $10^{-6}$ Torr, or higher for an ion trap) as would be used in a mass spectrometer.

Element 2 represents the sample inlet, which could exist in many forms for a mass spectrometer. The inlet could be from direct atmospheric sampling, or from the outlet of a separation device (such as a gas chromatograph or a liquid chromatograph) or virtually any other means by which a physical sample may be introduced into a mass spectrometer vacuum chamber in microscopic quantities.

Element 3 represents an electron source, which is used to inject electrons with sufficient energy (typically ~70 e.v.) to ionize the individual sample molecules. All mass spectrometers require ionization of the sample molecules before the masses of the individual molecules can be detected. There are many techniques for sample ionization that can be employed in a portable mass spectrometer, but the technique of injecting an electron beam into the sample (while the sample is in the gas state) represents one of the oldest, simplest, and most effective ways of ionizing a sample.

After the sample ions are ionized they are accelerated towards the analyzer 4, usually through use of one or more focusing lenses (not shown). The analyzer 4 may be selected from a virtually unlimited variety of instrument geometries. As an example of the wide range of mass spectrometer analyzers available, a portable mass spectrometer analyzer may be selected from any of the following: small magnetic sector (single or double focusing), quadrupole mass filter, 3-dimensional ion trap, cylindrical ion trap, hyperbolic linear trap, rectilinear ion trap, toroidal ion trap, time-of-flight, in addition to a hybrid configuration, or any other type of mass analyzer that can function as a mass spectrometer.

After leaving the analyzer 4, the ions (which have typically been selected by ejecting them according to their mass/charge (m/z) ratios, will be detected and recorded by the ion detector shown at element 5. This ion detector may take a variety of forms. It may consist of an electron multiplier, a conversion dynode followed by an electron multiplier, or even a simple Faraday cup collector. Once the ions have been detected, an electrical representation of their presence will be transmitted to an external data recorder or data display.

All of the preceding assumes that the path of the sample molecules within the analyzer occurs within an appropriate vacuum, which can range from $10^{-6}$ Torr (or below) for a sector instrument, quadrupole mass filter, or time-of-flight, on up to as high as $10^{-2}$ Torr for an ion trap type of instrument.

Element 6 and 7 shows the cryogenic pump installed in the mass spectrometer vacuum manifold. Element 7 represents the actual cryogenic module itself (as an example: a Stirling engine), mounted outside the vacuum manifold, while element 6 represents the "cold finger" protruding into the manifold through an appropriately sized orifice, mounted to the cryogenic module itself. The surface of the cold finger, when the cryogenic module is operating, is typically below 80 degrees Kelvin, and often below 70 degrees Kelvin (which is cold enough to trap both Nitrogen and Oxygen).

When the portable mass spectrometer is attached to the docking station, the cryocooling module is shut off, and the valve at 9 is opened to pump the outgas from the cold finger. Additionally, the cold finger may be heated to decrease the total regeneration time. Then, after the cryopump has been regenerated, the valve 9 is closed and the mass spectrometer may be removed from the docking station and placed back into normal operation.

If the cryopump is not sufficient to handle the type of gas load presented by the sample (typically Helium), then the instrument may include an additional small ion pump 10, to handle the gas load presented by the lower molecular weight molecules.

Figure 2:
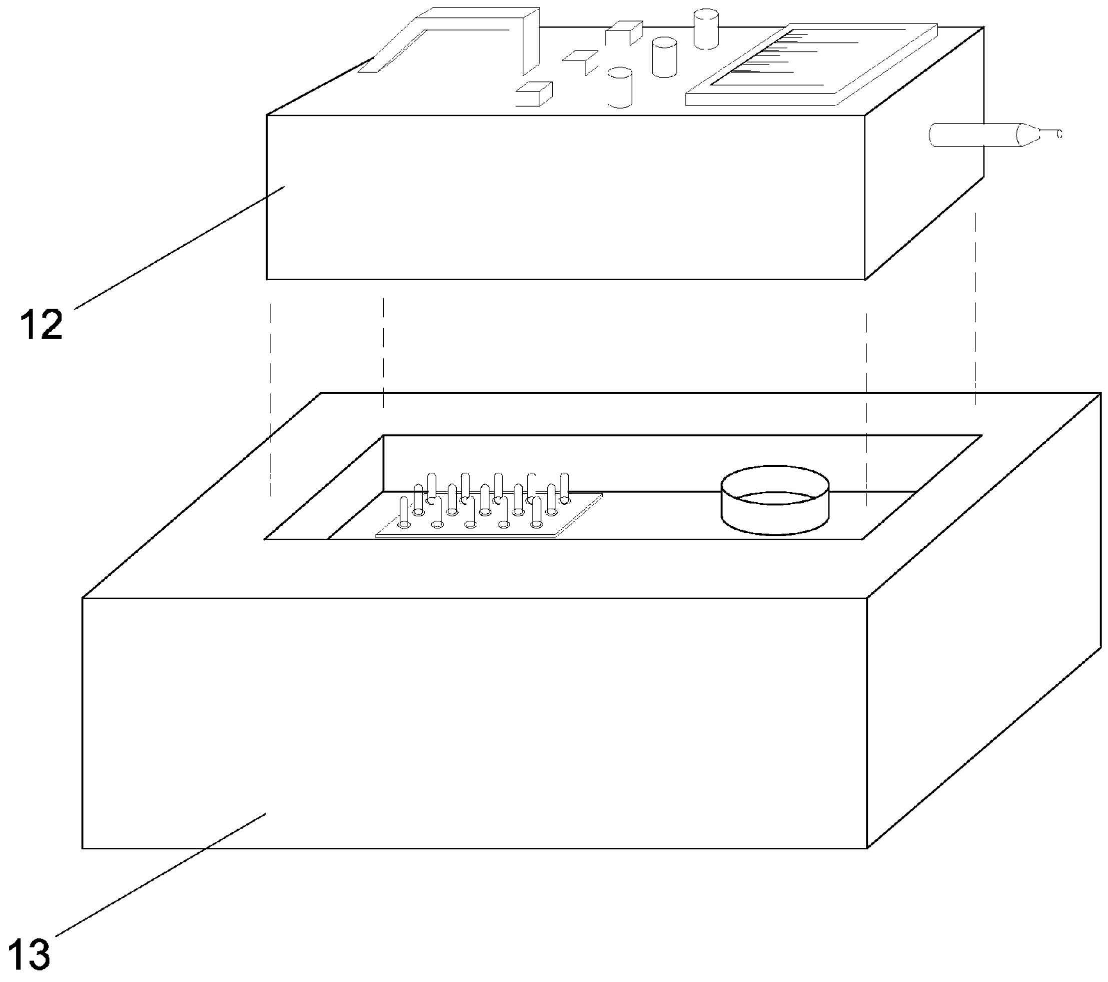

FIG. 2 shows an illustration of the manner in which a portable mass spectrometer would be connected to a "docking station" 13. In normal operation, the portable mass spectrometer would be battery powered and free to be moved to the location to be sampled. Eventually, as the battery charge diminishes, and the cryopump saturates, the mass spectrometer 12 will need to be returned to the docking station 13, where the battery will be recharged, and the cryopump regenerated.

DETAILED DESCRIPTION OF THE INVENTION

In one embodiment the invention relates to the use of a cryogenic pumping system used with a portable, or handheld, mass spectrometer, operated in conjunction with a docking station used to recharge the mass spectrometer battery, calibrate the mass spectrometer, and regenerate the cryopump. The mass spectrometer could comprise any of a number of different types of mass analyzers, including: a three-dimensional quadrupole ion trap, a cylindrical ion trap, a linear quadrupole ion trap, a rectilinear ion trap, a toroidal ion trap, a time-of-flight instrument, or a small magnetic sector instrument.

During operation of the mass spectrometer, the cryocooler's cold finger presents an extremely cold surface area on which gases inside the mass spectrometer manifold will condense, thereby increasing the vacuum inside the instrument. The largest contributor to the gas pressure within a mass spectrometer (excluding any contribution from the actual sample itself, or from any injected buffer gas) comes from the presence of nitrogen, oxygen, and water. Several manufacturers of miniature cryocooling systems offer units that can reach temperatures below 77 degrees Kelvin, which is cold enough to trap nitrogen and oxygen.

These atmospheric background molecules, including whatever sample molecules might be present, will adhere to the surface of the cold finger and remain there during the operation of the instrument. At some point, the pumping speed of the cryocooling system will diminish and eventually stop as the cold finger becomes saturated. At this point the cryopump must undergo a process called "regeneration". During the regeneration phase, the cryocooler is turned off and a pump 8 is applied to the vacuum manifold housing the cold finger. Ideally, for faster regeneration, the cold finger should also be heated, typically to above 80 Degrees Centigrade to accelerate the regeneration process.

As an example, while a workable cryogenic cooling device could be obtained from a variety of vendors, the Ricor company offers several small cryocooling devices having a cold finger of approximately 8 mm diameter, with a length of approximately 40 mm, that are easily capable of generating a vacuum suitable for mass spectrometry analysis.

The cryocooling device must be connected to a power source, and will typically be powered by a 6 or 12 VDC supply. Maximum input power for a small cryocooler is typically less than 20 Watts, with steady state power of approximately 5 Watts. The cryocooler can reach its operating temperature in less than 10 minutes, with a weight of less than 400 grams. Under these conditions the cryocooler system will approach an effective pumping speed of 10 liters/second.

Due to the light weight and small size of the cryocooler module, it would be possible to extend the operating time of the portable mass spectrometer by installing more than one cryocooler module and cold finger into the instrument manifold. In this manner, as the first cold finger becomes saturated and its pumping capacity becomes reduced, the second cryocooler could then be started to extend the operating time of the mass spectrometer before it will need to be placed back into the docking station to recharge the batteries and regenerate the cold fingers connected to the cryocooler modules.

In actual operation, the vacuum manifold must first be pumped down to a pressure in the milli-Torr region. To accomplish this with the described invention, the portable mass spectrometer must first be placed onto the docking station.

The docking station performs a variety of functions. It will charge the mass spectrometer battery supply, regenerate the cryocooler, and perform a mass calibration on the instrument after the cryocooler has been regenerated.

To regenerate the cryocooler on the docking station, the mass spectrometer vacuum manifold must be mechanically connected to a pump 8 located within the docking station. The pump located in the docking station could be a small roughing pump, or even a turbomolecular pump backed up by a rough pump. Any sort of pumping system could be used that is capable of creating a vacuum in the milli-Torr range and maintaining that vacuum while the cryocooler is being regenerated.

The cryocooling device forms an ideal method of pumping a portable, or handheld mass spectrometer. The cryocooler is small, lightweight, extremely rugged, attains full pumping speed in less than ten minutes, and operates with a low voltage DC supply with no high voltage requirement.

When the cryocooled portable mass spectrometer is used with the docking station described here, it allows for the cryocooler to be easily regenerated without requiring an additional rough pump, or turbomolecular pump, to be included in the portable mass spectrometer. This permits the creation of a lightweight, low-power, and very rugged portable, or handheld mass spectrometer to be used for a variety of field, or laboratory applications.

There are some situations where a portable mass spectrometer contains a gas chromatograph to perform some degree of sample separation prior to compound identification. Normally, Helium will be used as a carrier gas to move the sample molecules through the gas chromatograph column. For mass spectrometers employing ion trapping techniques, Helium may also be injected into the mass spectrometer manifold to be used as a buffer gas. The Helium that enters the vacuum manifold of the portable mass spectrometer cannot be pumped away by the cryogenic pump due to the low boiling point of Helium (4.2 degrees Kelvin). In this case, a small ion pump can be operated simultaneously with the cryogenic pump. In this case, the cryogenic pump will be able to pump the air background and sample molecules, while the ion pump removes the injected Helium.

The additional ion pump could comprise either a standard diode pump, a noble diode pump, or a triode pump. Each of these ion pump types employs a slightly different pump geometry. The standard diode type ion pump has the simplest structure, but does not pump Helium effectively. The noble diode type ion pump does not use a titanium strip to adsorb the gases, but instead uses a tantalum strip, which does a much better job at pumping Helium. The triode type ion pump also does a good job of pumping Helium as well as all other gases. Therefore, if an additional ion pump is used with the portable mass spectrometer to facilitate the pumping of Helium, it should be of the noble diode, or triode type ion pump.

The additional ion pump could be run simultaneously with the cryopump, or it could be run by itself, or in an alternating fashion in which only one pump is in operation at any one time.

In another embodiment it is possible to operate the portable mass spectrometer described here through use of a simple getter pump 11, without using the cryopump. In this embodiment the getter pump 11 would consist of a chamber, or area, within the mass spectrometer manifold containing a quantity of non evaporable getter (NEG) material sintered onto a surface or container within the mass spectrometer manifold. The NEG material normally consists of a powdered mixture of Aluminum, Zirconium, Titanium, Vanadium, and Iron. Although the getter material itself is static, the presence of the reactive getter material within the mass spectrometer manifold forms an effective vacuum pump.

In another embodiment the getter pump would be used together with the cryopump module itself. In this embodiment the portable mass spectrometer contains both a cryogenic pump and a container of getter material which would be capable of adsorbing most gases present within the mass spectrometer manifold.

The invention claimed is:

1. An apparatus for creating a vacuum within a portable mass spectrometer, comprising a cryogenic cooling module and a cold finger, both installed in said portable mass spectrometer, in conjunction with a separate docking station containing a backing pump or other high vacuum pump suitable for initial pumping of said portable mass spectrometer when said portable mass spectrometer, containing said cryogenic cooling module, is connected to said docking station, where said mass spectrometer will be placed into operation after reaching a suitable operating pressure and then disconnected from said docking station.

2. The apparatus of claim 1, in which said portable mass spectrometer contains a mass analyzer selected from the group consisting of: a magnetic sector analyzer; a quadrupole mass filter; a three-dimensional ion trap; a quadrupole linear ion trap; a rectilinear ion trap; a cylindrical ion trap; a toroidal ion trap; a time-of-flight analyzer; an orbitrap; an ion cyclotron resonance analyzer.

3. The apparatus of claim 1, in which said portable mass spectrometer contains an additional vacuum pump which may be run alternatively or simultaneously with said cryogenic cooling module to pump Helium and other low molecular weight gases from said portable mass spectrometer.

4. The apparatus of claim 1, in which said portable mass spectrometer contains an additional vacuum pump which is an ion pump chosen from the group consisting of: standard diode pump; noble diode pump; triode pump, and in which said ion pump may be run alternatively or simultaneously with said cryogenic cooling module.

5. The apparatus of claim 1, in which said portable mass spectrometer contains an additional vacuum pump which is a getter pump, said getter pump comprising a quantity of non evaporative getter (NEG) material, in which said NEG material is contained, or deposited, within said portable mass spectrometer manifold, and in which said getter pump may be run separately or simultaneously with said cryogenic cooling module.

6. The apparatus of claim 1, in which said cryogenic cooling module comprises a Stirling engine connected to a cold finger, in which said cold finger extends into said mass spectrometer and functions as a vacuum pump.

7. An apparatus for generating a vacuum within a portable mass spectrometer comprising a getter pump consisting of a quantity of non evaporable getter (NEG) material within said portable mass spectrometer, in conjunction with use of a fixed docking station containing a backing pump or other high vacuum pump suitable for initial pumping of said portable mass spectrometer, when said portable mass spectrometer is connected to said docking station, where said mass spectrometer will be placed into operation after reaching a suitable operating pressure and then disconnected from said docking station.

8. The apparatus of claim 7, in which said portable mass spectrometer contains a mass analyzer selected from the group consisting of: a magnetic sector analyzer; a quadrupole mass filter; a three-dimensional ion trap; a quadrupole linear ion trap; a rectilinear ion trap; a cylindrical ion trap; a toroidal ion trap; a time-of-flight analyzer; an orbitrap; an ion cyclotron resonance analyzer.

9. A method for generating a vacuum within a portable mass spectrometer comprising the lowering of the temperature of a section of the mass spectrometer manifold, or a part present within said manifold, to a temperature below 77 degrees Kelvin, which will be of sufficiently low temperature to condense Nitrogen and other gases having a boiling point above 77 degrees Kelvin, onto said section of manifold or a part present within said manifold, to effectively lower the vacuum pressure within said manifold to permit the operation of said portable mass spectrometer, with said portable mass spectrometer being periodically connected to a separate docking station used to create a vacuum within said portable mass spectrometer to allow for the initial pumping of said mass spectrometer containing a cryogenic cooling device, where said mass spectrometer will be placed into operation after reaching a suitable operating pressure and then disconnected from said docking station.

10. The method of claim 9, in which said portable mass spectrometer contains a mass analyzer selected from the group consisting of: a magnetic sector analyzer; a quadrupole mass filter; a three-dimensional ion trap; a quadrupole linear ion trap; a rectilinear ion trap; a cylindrical ion trap; a toroidal ion trap; a time-of-flight analyzer; an orbitrap; an ion cyclotron resonance analyzer.

11. The method of claim 9, in which the vacuum pumping system of said portable mass spectrometer is enhanced for the pumping of Helium, and other low molecular weight gases, by adding additional pumping capacity to said portable mass spectrometer by which said additional pumping capacity is generated by adding an ion pumping action to said mass spectrometer manifold.

12. The method of claim 11 in which the efficiency of the vacuum system of said portable mass spectrometer is increased by applying said cryopumping action and said ion pumping action either separately or simultaneously.

13. The method of claim 9, in which the cryopumping capacity of said portable mass spectrometer may be enhanced for the pumping of Helium, and other low molecular weight gases, by adding additional pumping capacity to said portable mass spectrometer by which said additional pumping capacity is generated through addition of a gettering action, implemented by adding a reactive, non evaporative getter (NEG) material to said mass spectrometer manifold.

14. The method of claim 13, in which the efficiency of the vacuum system of said portable mass spectrometer is increased by applying said gettering action separately, or simultaneously with said cryopumping capacity.

* * * * *